United States Patent [19]
Johnson

[11] Patent Number: 5,641,339
[45] Date of Patent: Jun. 24, 1997

[54] TANGENTIAL SEPARATOR AND METHOD

[75] Inventor: Richard D. Johnson, Memphis, Tenn.

[73] Assignee: Air Conveying Corporation, Memphis, Tenn.

[21] Appl. No.: 508,106

[22] Filed: Jul. 27, 1995

[51] Int. Cl.⁶ .................... B01D 45/12; B01D 50/00
[52] U.S. Cl. .................... 95/268; 55/337; 55/428;
  55/452; 55/455; 55/459.1; 55/460; 209/27;
  209/137; 406/173
[58] Field of Search .................... 95/271, 268, 267;
  55/337, 459.1, 460, 452, 454, 455, 428,
  429, 430, 431, 432, 433; 209/27, 29, 139.2,
  137, 148, 250, 281; 406/171, 173

[56] References Cited

U.S. PATENT DOCUMENTS

| | | | |
|---|---|---|---|
| 2,076,988 | 4/1937 | Garrett | 19/72 |
| 2,166,925 | 7/1939 | Mitchell | 209/250 |
| 2,304,778 | 12/1942 | Cresswell | 55/452 |
| 2,418,061 | 3/1947 | Weinberger | 55/459.1 |
| 2,643,734 | 6/1953 | Rowell | 209/250 |
| 3,031,825 | 5/1962 | De La Fourniere | 55/460 |
| 3,116,238 | 12/1963 | Van Etten | 209/250 |
| 3,618,303 | 11/1971 | Nagel | 55/460 |
| 3,797,661 | 3/1974 | Buzga | 95/268 |
| 4,108,778 | 8/1978 | Lambert et al. | 55/337 |
| 4,251,356 | 2/1981 | Harte | 209/250 |
| 4,269,701 | 5/1981 | Hock et al. | 209/250 |
| 4,300,926 | 11/1981 | Brooks | 55/319 |
| 4,484,843 | 11/1984 | McGlinsky et al. | 406/170 |
| 4,721,561 | 1/1988 | Oetiker et al. | 55/416 |
| 4,900,345 | 2/1990 | le Jeune | 55/337 |
| 5,294,218 | 3/1994 | Fiorentini et al. | 406/173 |

FOREIGN PATENT DOCUMENTS

| | | | |
|---|---|---|---|
| 108604 | 1/1968 | Denmark | 209/250 |
| 1053472 | 3/1959 | Germany | 209/250 |
| 460078 | 2/1975 | U.S.S.R. | 209/250 |
| 664689 | 5/1979 | U.S.S.R. | 209/250 |

Primary Examiner—Jay H. Woo
Assistant Examiner—Duane S. Smith
Attorney, Agent, or Firm—Fitch, Even, Tabin & Flannery

[57] ABSTRACT

A method and apparatus for separating material transported by air is disclosed which includes a separator casing having a tangential inlet adapted to receive a stream of air and entrained material and a plurality of exits. One of the exits of the disclosed separator is a material discharge exit which, like the inlet is peripherally attached to the casing. There are also two separate air exits including a first air exhaust conduit peripherally attached to the casing proximate the inlet and a second air exhaust conduit centrally disposed within the interior of the casing. Operatively associated with each of the air exits is a separator means, such as a perforated surface or screen, which removes or separates the entrained material from the air.

20 Claims, 4 Drawing Sheets

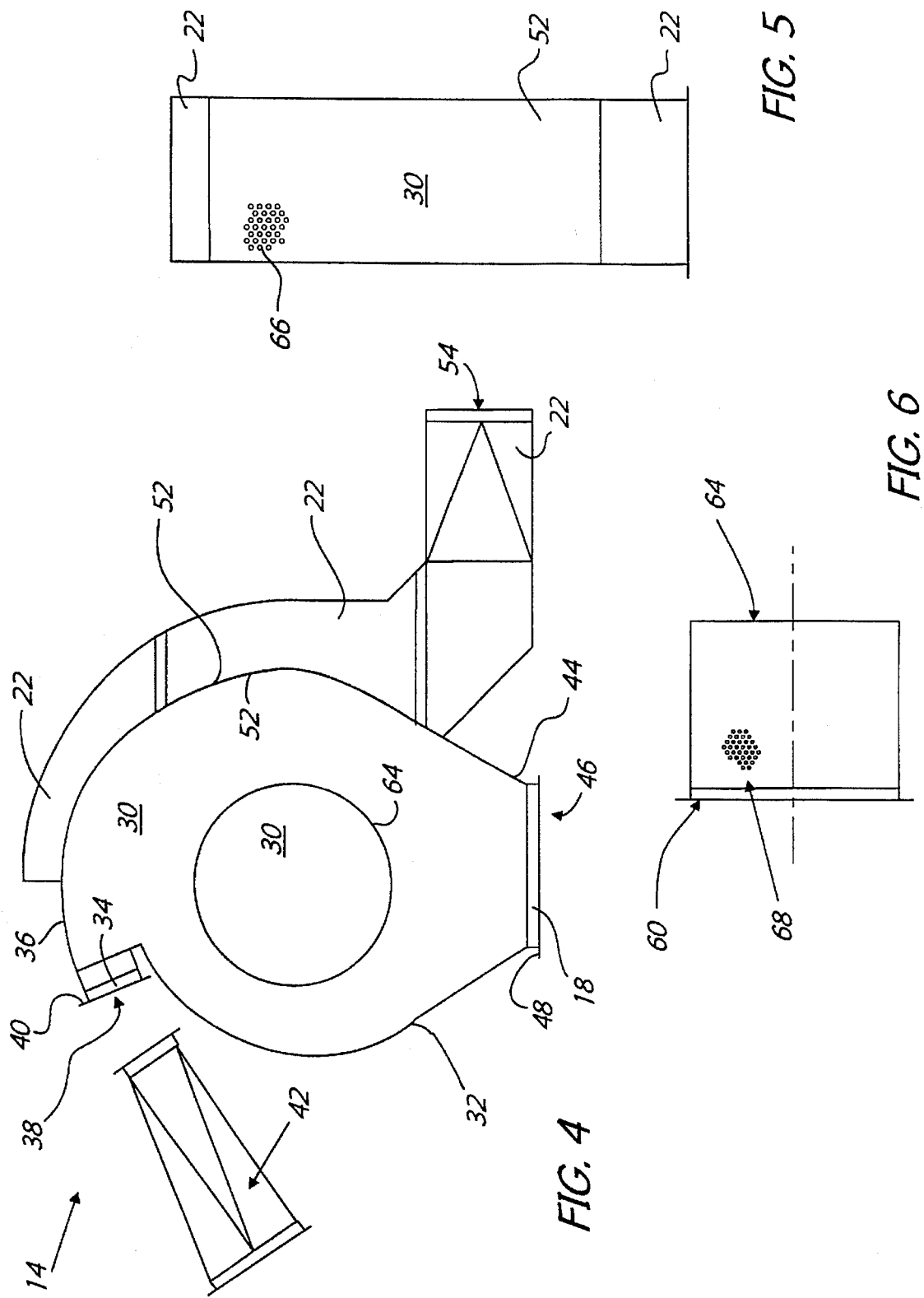

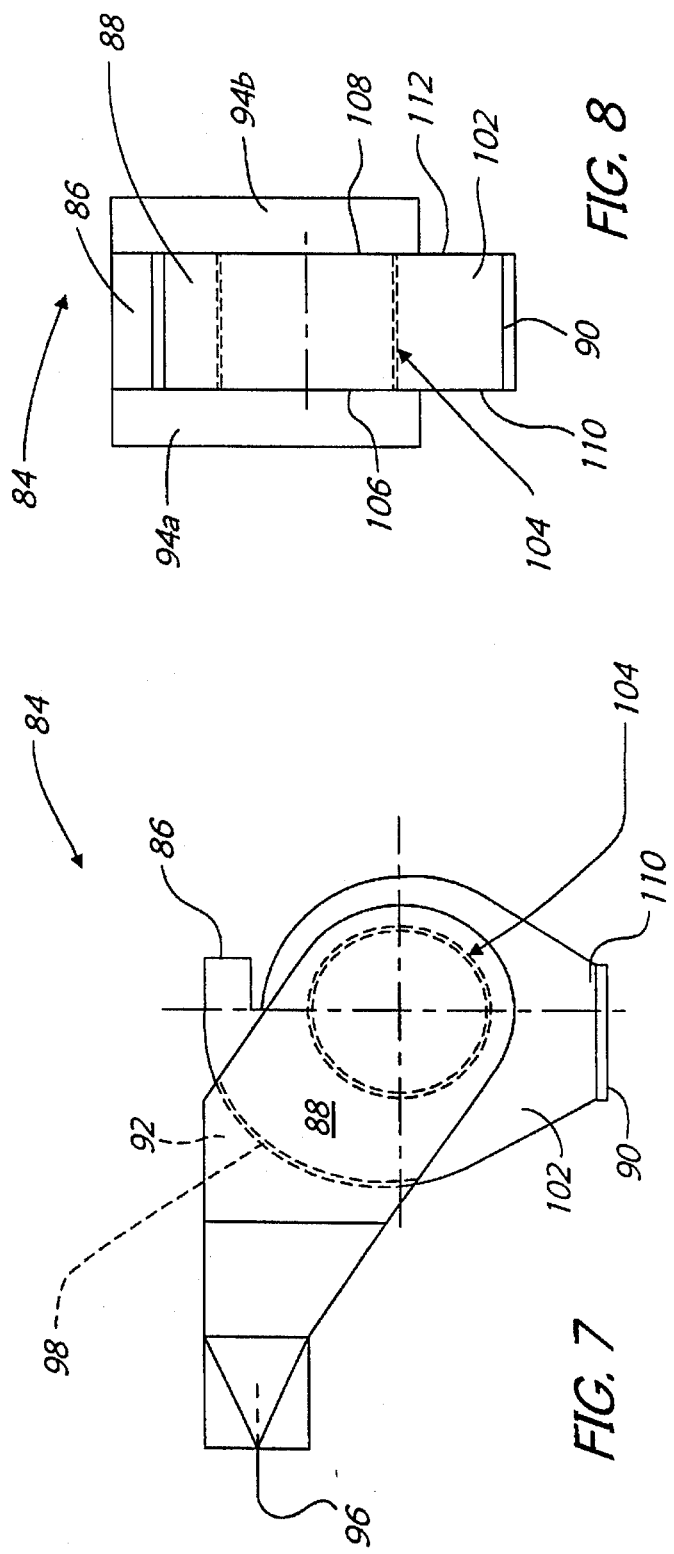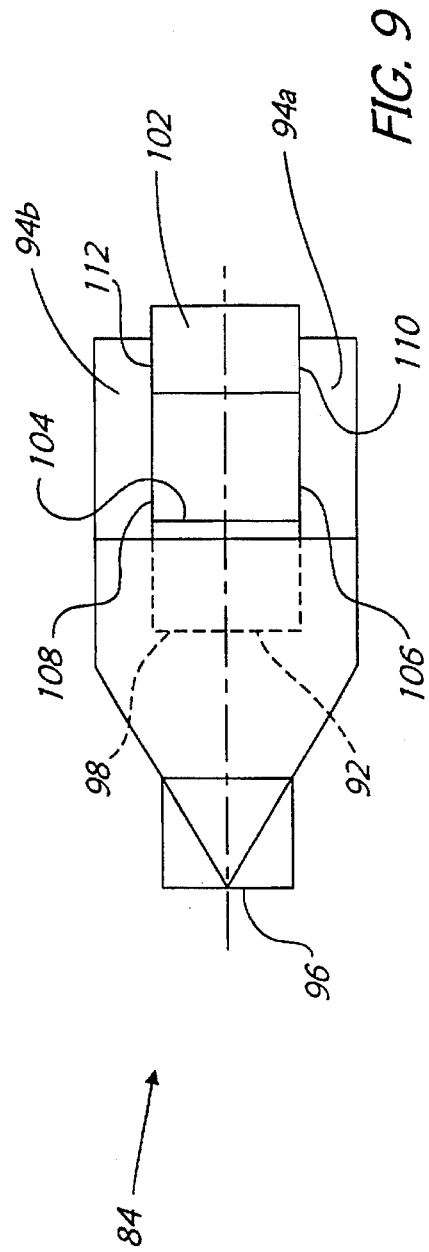

TANGENTIAL SEPARATOR AND METHOD

FIELD OF THE INVENTION

The present invention relates to air separators and more particularly to an improved method and apparatus for separating and accumulating airborne material.

BACKGROUND OF THE INVENTION

A wide variety of separators have been developed that separate and accumulate various objects transported by an air stream, such as paper waste, scrap material, food items, or other products. These separators utilize various configurations which are designed to receive a high velocity stream of air transporting prescribed objects, and subsequently separate the objects from the conveying air. The objects are typically accumulated at or near a designated exit, while the air or other transport gas is directed to a second exit. A problem associated with many separating systems, and particularly in separating systems design for the collection of scrap paper, is that they typically generate a large amount of dust and/or other air-borne contaminants proximate the material exit.

One type of separator that has been extensively used is a cyclone separator wherein the transported objects and a stream of air are introduced into a large cylindrical or cone-shaped device. The transported objects are introduced into the cylindrical housing so that they are thrust against the outer wall by centrifugal forces resulting from the flow of the air stream within the cylinder. The air exits via the top of the cylindrical device while the objects are typically funneled out a bottom exit. Cyclone separators are generally very large and somewhat expensive pieces of mechanical equipment. Cyclone type separators are often so large that it is not feasible to install them inside a building. Consequently, most cyclone type separators are typically situated outside the building and often on the roof of the building. Reducing the dust in these exterior cyclone separators has not been of great concern because the presence of dust outside a building typically does not adversely affect people or equipment.

A prior art cyclone separator system that is concerned with the separation of dust from the transported objects is disclosed in U.S. Pat. No. 3,116,238 issued to Van Etten. The '238 patent discloses a modified cyclone type separator that includes the standard central air discharge funnel directing the air from the cyclone separator. It also includes a screen disposed along the outer wall of the separator to facilitate the separation of removal dust and fine particles from the stream of air and conveyed material. While this device attempts to address the problem caused by dust associated with the separating action, there remain several other problems associated with this patented device. Namely, it is still a very large device, and the air maintained within the housing is maintained at a high velocity and thus a relatively high static pressure.

Another type of separator is a tangential separator where the transported objects are recovered on a flat or cylindrical screen and the air which passes through the screen exits the separator in a generally tangential orientation. Tangential separators are typically smaller devices than the cyclone separators and thus are often installed within the confines of a building or factory. For this reason, the air exiting the tangential separator is typically reintroduced into the interior environment of the building or is reused within the air conveying system. In either situation, it becomes increasingly important to filter the exiting air prior to its reuse and to minimize the dust and other contaminants introduced into the environment near the material exit.

Most applications in which tangential air separators are used can be classified either as a positive ("upush type") system, a draw through ("pull type") system, or a hybrid system. As the classification suggests, draw through or "pull type" systems are those in which the air stream and transported objects are pulled into the separator with a fan located downstream of the separator. In such draw through systems, the separator is typically maintained below atmospheric pressure and typically requires an air lock to prevent any back flow of air from the object discharge exit. Positive or "push type" systems, on the other hand, include systems where the air and conveyed objects are blown into the separator with the fan located upstream of the separator. In push type systems, the pressure within the separator is above standard atmospheric pressure. The hybrid systems involve both "pushing" as well as "pulling" of the conveying air stream such that an ideal pressure is maintained within the separator.

Clearly, the static pressure within the tangential separator is an important design consideration. Consider for the moment, a push type paper conveying and separation system where the paper material exits the separator and falls to a baler or compactor. If the static pressure at the material exit of the separator unit is too high, dust and paper scraps tend to swirl around the material exit resulting in a somewhat untidy and very dusty environment proximate the material exit. However, if the static pressure at the air and material inlet in the separator unit is too low, the result is an inefficient conveying system susceptible to clogging.

Pull type systems and hybrid type systems alleviate some of the aforementioned static pressure concerns but are generally more complex and more expensive systems. Moreover, the push type tangential separator systems are often the simplest to design, and are easy to install and maintain.

One related art tangential air separator is disclosed in U.S. Pat. No. 4,900,345 issued to Le Jeune which discloses the use of a deformed cylindrical grid in a tangential separator which allows most of the air flow to exit tangentially through the separator. The remainder of the air together with the transported objects presumably exit through a central exit portion of the separator via the spiral nature of the deformed cylindrical grid.

Another related art tangential separator system is disclosed in U.S. Pat. No. 4,300,926 issued to Brooks which discloses a separation apparatus adapted to receive a stream of airborne material and which includes a single rear exit screen and a bottom material exit. An adjustable baffle is located near the separator inlet directing the incoming stream to the rear exit screen which allows the air to exit tangentially while the material continues to be transported through separator. The separator is designed with an increasing cross-sectional area for decelerating the transported material as it moves through the duct.

Still another related art system is disclosed in U.S. Pat. No. 4,484,843 issued to McGlinsky et al. which shows a multi-chamber pneumatic conveying scrap paper system that also utilizes a flat rear exit screen for passing air and dust while the paper is directed and/or falls downward to a gathering hopper.

While these related art systems may adequately separate the transported material from the air stream, there remains a need to provide an improved tangential separator that is relatively small device, yet simple to install, operate and maintain and more importantly facilitates the relatively clean discharge of material.

SUMMARY OF THE INVENTION

The present separating apparatus is a tangential air separator for separating material transported by air or other transport gases and includes a casing having a tangential inlet adapted to receive a stream of the air and material and a plurality of exits. The casing of separator assembly includes a perforated outer wall proximate the inlet which functions as a means for peripherally removing a portion of air from the stream of air and material received at the inlet. An important advantage offered by the perforated outer wall is that it decreases the velocity of the stream of air transporting the material and also reduces the static pressure within the separator casing. A second air separation device is disposed in the interior of the casing and is adapted to further separate the air from the material entrained therein, leaving mostly the transported material.

Two separate and distinct air exits are provided including a first air exhaust conduit peripherally attached to the casing and operatively associated with the peripheral means for removing an initial portion of air and a second air exhaust conduit operatively associated with the interior means for separating air. Another exit on the separator apparatus is the material discharge exit which, like the inlet, is peripherally attached to the casing. Because of the multiple air exits, the static pressure remains relatively low at the material discharge exit. Thus there are no significant problems associated with swirling dust and other particles near the collection site.

In one aspect of the invention, the casing is a generally cylindrical shaped casing with an air and material inlet being tangentially oriented near the top of the casing. The material discharge exit or outlet is preferably located at the bottom of the casing so as to allow the material to exit out of the separator after much of the air has been removed. The peripheral air removal means is a perforated arcuate surface which advantageously improves the flow of air and material within the casing. The interior air exit means is a perforated cylinder concentrically disposed in the cylindrical shaped casing. The second air exhaust conduit can be tailored to provide bi-directional flow of the exit air out of each side of the cylindrical shaped casing or may alternatively retain the conventional uni-directional flow out of one side of the casing.

In another aspect of the invention, the two air exits of the separator apparatus can be combined and directed to a single air outlet. The air discharged from the single air outlet can be returned to its point of origin to be re-used for conveying additional material. In addition, an appropriate filtering means can be incorporated within the air outlet such that the removed and separated air can be safely recycled and/or re-introduced into the immediate environment. Further, since the present tangential separator apparatus is relatively small in size as compared with cyclone type separators, it is particularly suitable for use inside a building.

The invention may also be characterized as a method for separating material transported by air which comprises the steps of: (a) receiving a stream of air and material at an inlet of a casing, the inlet being disposed at the periphery of the casing; (b) removing a portion of air from the stream of air and material via a peripheral air exit proximate the inlet in order to decrease the velocity of the stream of air transporting the material and reduce the static pressure within the casing; (c) directing the removed portion of air via a first exhaust conduit to an air outlet located apart from the casing; (d) further separating air from the material within the interior of the casing; (e) transporting the separated air out of the casing via a second exhaust conduit; and (f) discharging the material remaining in the casing via a material outlet, the material outlet being located at the periphery of the casing and apart from the inlet.

The present method and apparatus for separating airborne material realizes the aforementioned features and advantages in a manner that is clearly evident from a thorough consideration of the detailed description when taken in conjunction with the drawings wherein there is shown and described illustrative embodiments of the invention.

BRIEF DESCRIPTION OF THE DRAWINGS

In the following detailed description, reference will be made to the attached drawings in which:

FIG. 4 is cross-sectional side view of the separator apparatus illustrated in FIG. 1 taken generally along line 4—4 of FIG. 3;

FIG. 5 is a cross-sectional view taken along line 5—5 of FIG. 2 illustrating the perforated outer wall of the separator apparatus;

FIG. 6 is an elevational view of the interior perforated cylinder used for separating the air from the material present within the separating chamber;

FIG. 7 is a side view of an alternative embodiment of a separator apparatus embodying various features of the invention;

FIG. 8 is a front view of the separator apparatus illustrated in FIG. 7; and

FIG. 9 is a top view of the separator apparatus illustrated in FIG. 7.

DETAILED DESCRIPTION OF THE PREFERRED EMBODIMENTS

The following description includes the best mode presently contemplated for carrying out the invention. This description is not to be taken in a limiting sense, but is made merely for the purpose of describing the general principles of the invention. The scope of the invention should be determined with reference to the claims.

Figure 1:
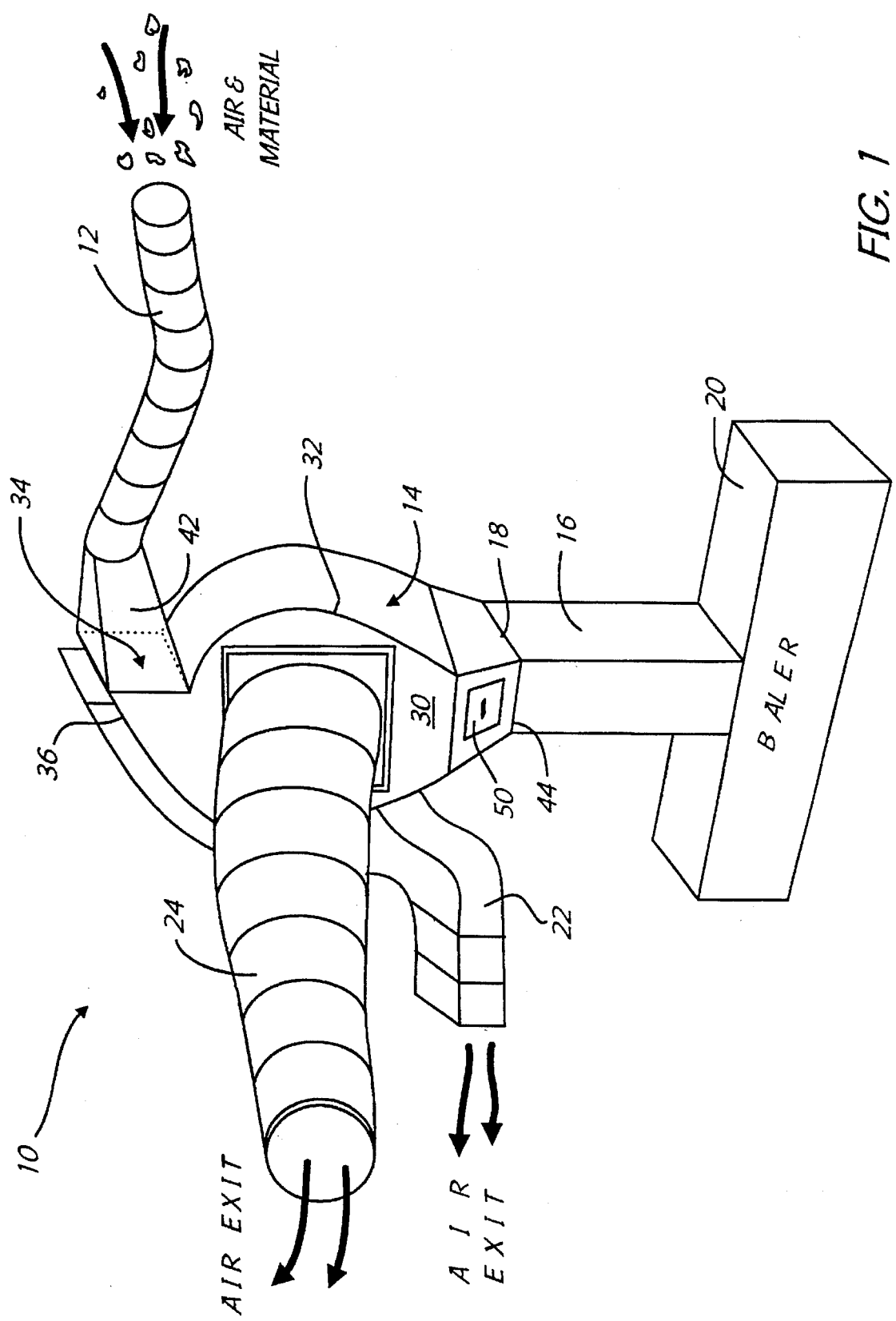
FIG. 1 is a perspective view of a tangential separator system for separating and accumulating airborne material, such as paper scrap, embodying various features of the present invention.

Referring to FIG. 1, there is illustrated a tangential air separator system 10 particularly suited for separating material, such as scrap paper, conveyed in a stream of air inside a factory or other building. The illustrated tangential air separating system 10 includes an inlet duct 12 or network of inlet ducts, a tangential separator apparatus 14, an outlet chute 16 leading from a material discharge exit 18 of the separator apparatus 14 to a baler 20 or compactor, and a plurality of air exhaust conduits 22, 24 extending from the separator apparatus 14. The illustrated system 10 is a "push type" tangential separator wherein the air stream and conveyed material are blown through the inlet ducts 12 into the separator apparatus 14 with a fan (not shown) associated with the inlet ducts 12 and located upstream of the separator apparatus 14. The conveyed material is effectively separated from the air stream within separator chamber 30 within the apparatus 14. Most of the air stream exits the separator chamber 30 via the air exhaust conduits 22, 24 while the conveyed material exits via the material discharge exit 18 to the chute 16 and eventually to a baler 20 or compactor. The air stream being discharged through the air exhaust conduits 22, 24 is then filtered and subsequently recycled and/or reintroduced into the immediate environment.

The size of the separator apparatus 14 and associated ducting is very much dependent on the volume of the air stream necessary to efficiently convey the material as well as the general character of the scrap paper being separated. Further, the illustrated embodiment can be easily modified to include multiple inlets and/or multiple separating chambers sharing the same air exhaust conduits.

Figures 2, 3:
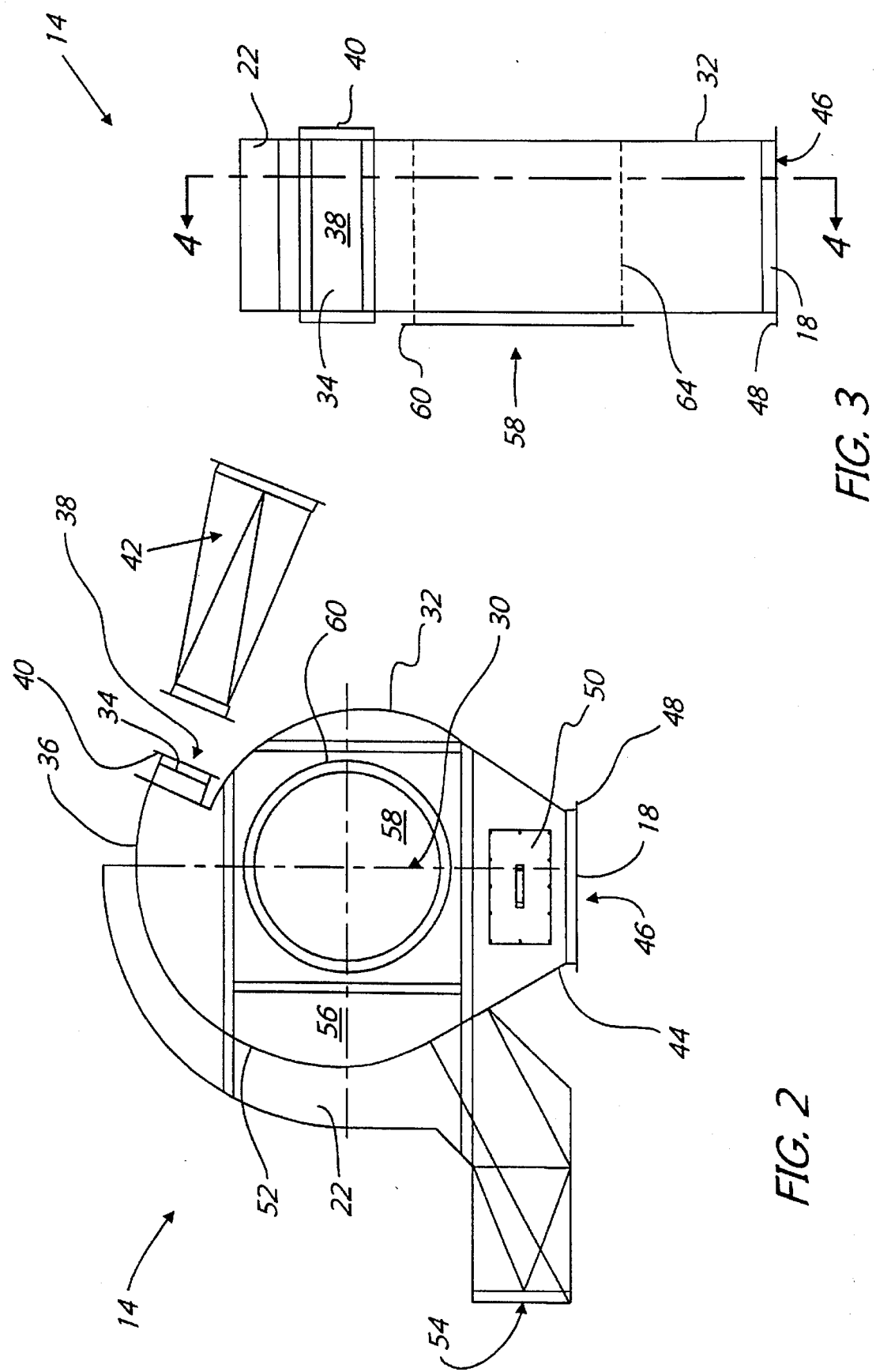
FIG. 2 is a side elevational plan view of the separator apparatus illustrated in FIG. 1 with one air exhaust conduit removed.
FIG. 3 is a front plan view of the separator apparatus illustrated in FIG. 1.

FIGS. 2 and 3 illustrate side and front views of the separator apparatus 14, respectively. As seen therein, the separator apparatus 14 is a generally cylindrical shaped casing 32 having a tangentially oriented air and material inlet 34 located at or near the top 36 of the cylindrical casing 32. In the illustrated embodiment, the air and material inlet 34 is a 10 inch by 29 inch rectangular opening 38 with a two inch wide flange 40 or collar disposed around the perimeter of the rectangular opening 38 to facilitate attachment to inlet duct 12. The illustrated embodiment further includes an inlet transition adapter 42 having a length of about 39.5 inches to facilitate connection between a standard 18 inch diameter inlet duct 12 and the rectangular opening 38 of the air and material inlet 34 on the separator apparatus 14. Advantageously, the inlet transition adapter also increases the cross sectional area of the incoming duct, e.g. by about 15%, thereby slowing the velocity of the airstream slightly.

The separator apparatus 14 further has a material discharge exit 18 located at the bottom 44 of the generally cylindrical casing 32. The illustrated material discharge exit 18 is a 29 inch by 29 inch opening 46 with a two inch wide flange 48 disposed around the perimeter of the opening 46 to facilitate connection to a feed chute 16 leading to the baler 20 or compactor.

The illustrated separator apparatus further includes two air exhaust conduits 22, 24 and a separator chamber access door 50. The first air exhaust conduit 22 is peripherally attached to the perforated back outer wall 52 of the cylindrical casing 32 and leads away therefrom to an air outlet 54 located apart from the cylindrical casing 32. The second air exhaust conduit 24 is adapted to connect to a side 56 of the cylindrical casing 32 and remain in communication with the interior of the cylindrical casing 32 and separating chamber 30. In particular, the illustrated separator apparatus 14 has a 36 inch diameter hole 58 centrally located on one side 56 of the generally cylindrical casing 32. The casing 32 also has a standard 36 inch diameter angle ring 60 extending from the side hole 58 for engagement with the second air exhaust conduit 24 (See FIG. 1).

Referring now to FIG. 4, a cross-section view of the separator apparatus 14 is shown depicting the separation chamber 30 and the operative elements of the separator apparatus 14. The illustrated separation apparatus 14 includes two distinct separating devices. The first separating device is the perforated arcuate back outer wall 52 of the cylindrical casing 32 leading to the first air exhaust conduit 22. The second separating device is a perforated cylinder 64 centrally disposed in the separation chamber 30 and generally coaxial to the axis of the cylindrical casing 32. The perforated metal cylinder 64 is dimensioned so as to communicate with the second air exhaust conduit 24 through the side hole 58 as seen in FIG. 1.

As seen more clearly in FIG. 5, the perforated surface 52 extends from the top 36 of the cylindrical casing 32 and constitutes a substantial portion of the its back wall. The cross sectional area of the perforated surface 52 is about 18.4 square feet. The perforated surface is preferably a #12 gauge perforated sheet with a plurality of 0.15625 inch diameter holes 66 separated by 0.1865 inch and having staggered centers. Similarly, as seen in FIG. 6, the perforated cylinder 64 is comprised of the same #12 gauge perforated sheet with a plurality of 0.15625 inch diameter holes 68 and is dimensioned to be a 36 inch diameter tube about 29 inches long. The perforated cylinder 64 is coaxially placed within the cylindrical casing 32 aligned with the side hole 58. The angle ring 60 is securely attached to one end of the cylinder 64 and provides a support or connector for engagement with the second air exhaust conduit 24. The total cross sectional area of the perforated cylinder 64 is about 22.5 square feet.

In operation, the incoming stream of air and material enters the separating chamber 30 via the inlet transition adapter 42 (See FIGS. 1 and 4). In addition to connecting the separator apparatus 14 to the standard inlet ducting 12, the inlet transition adapter 42 also acts to slightly decelerate the stream due to the generally increased cross-sectional area of the inlet transition adapter 42. As the mixed stream enters the separating chamber 30, it encounters the perforated surface 52 of the separator apparatus 14. The dimensions of the perforations 66 and cross sectional area of the perforated surface 52 are chosen such that between about 50% and 75%, and more preferably about 60% of the volume of the air stream is immediately removed (i.e. passes through the back wall perforations) while retaining all of the transported material within the separating chamber 30. The remaining air and the material entrained therein continues to move through the separating chamber 30. As it progresses through the separating chamber 30, much of the material is forced towards the outer or back wall 52 of the cylindrical casing 32 as well as in a downward direction due to the forces present within the chamber coupled with the generally cylindrical configuration of the separating chamber 30. Because of this natural segregation of the entrained material towards the outer walls, the residual air is then easily separated from the material through the perforated cylinder 64 centrally disposed within the separating chamber 30. Again, the perforation size and dimensions of the perforated cylinder 64 are chosen to allow most of the remaining air, and only the air, to escape. The entrained material continues to move in a generally arcuate path around the cylindrical casing. When the entrained material reaches the bottom 44 of the casing 32, the entrained material escapes via the material discharge exit 18. Typically the material continues through a feed chute 16 to a horizontal compactor or baler 20.

The pressure drop between the inlet duct 12 and the material discharge exit 18 is preferably accomplished in three discrete steps. First, a small pressure drop is realized as the incoming air flow traverses the inlet transition adapter 42. In the preferred embodiment, the cross-sectional area at the entrance to the inlet transition adapter 42 is approximately 254 in$^2$ and gradually increases to a cross sectional area of about 290 in$^2$ at the inlet 34 to the separating chamber 30. Second, a pressure drop is realized due to the removal of a substantial volume of the air via the perforated outer wall 52. The remaining air and material stream proceeds at a velocity that is substantially slower than the entrance velocity due to the removal of the transport medium. Finally, another pressure drop is realized due to the separation and removal of air from the interior of the separating chamber. It is important to note that the shape, location, and the dimensions of both separation means 52 and 64 relative to one another as well as to the inlet 34 and material discharge exit 18 are very important considerations in the design of the present separator apparatus 14 in order to achieve the desired pressure drop, which has heretofore not been accomplished in a "push-type" separator system.

The combination of two air separating devices within a single separator apparatus, one peripherally positioned and one centrally located, provide a synergistic or at least a greater than expected reduction in static pressure across the separator casing. By way of comparison, the present embodiment demonstrates about a 25% lower level of static pressure near the material discharge exit than a comparably sized "push-type" separator having only a centrally disposed exit. Likewise, the present embodiment is believed to have a much lower static pressure near the material discharge exit than a comparably sized "push-type" separator having only a peripherally or tangentially located exit. This dual separation feature of the present embodiment minimizes the problems associated with swirling dust and other particles near the collection site. Further, the dual separation feature allows the design of the separator apparatus to be even more compact than previous designs, for a comparable volume of flow, while effectively separating the conveyed material.

As the air exits the separating chamber 30, it is channeled by the multiple exhaust conduits 22, 24 and released at a location that is a prescribed distance apart from the separator apparatus 14. Specifically, the air discharged from the air exhaust conduits 22, 24 can be routed back to its point of origin to be re-used for conveying additional material or can be discharged exterior of the building. In addition, an appropriate filter can be incorporated within the air exhaust conduits 22, 24 such that the air can be safely discharged inside the building.

Considering the operation of the presently described embodiment, the preferred method of separating material transported by a stream of air is defined by four essential steps. These four steps include: (1) receiving a stream of air and material at an inlet of a casing, the inlet being disposed at the periphery of the casing; (2) removing or separating a large portion of the incoming air stream via a perforated outer wall or other peripheral air exit of the casing that is immediately downstream of the inlet; (3) further removing or separating most of the remaining air from the material within the interior of the casing with a secondary separating device; and (4) discharging the entrained material via a material outlet, the material outlet being located at the bottom of the casing and spaced a sufficient distance from the inlet such that the pressure drop between the inlet and the material discharge exit is realized. As indicated above, the pressure drop between the inlet and the material discharge exit is accomplished in three discrete events corresponding to steps (1) through (3) above. Further, as the air is removed or separated in steps (2) and (3) above, it should be channeled or directed away from the casing to one or more air outlets by means of separate exhaust conduits operatively associated with each of the separating devices.

An alternative embodiment of such a tangential separator is illustrated in FIGS. 7–9. As seen therein, the separator apparatus 84 includes an inlet 86 for stream of air and material, a separating chamber 88, a material discharge exit 90 and a plurality of air exhaust conduits 92, 94a and 94b extending from the separator apparatus 84 to an air outlet 96.

The conveyed material is effectively separated from the air stream within the separating chamber 88 where there is shown a perforated metal surface 98 along the back wall of the cylindrical casing 102 and a centrally disposed perforated cylinder 104, as described above.

The separator illustrated in FIGS. 7–9 is generally the same as described with reference to FIGS. 1–6 except that the separator represented in FIGS. 7–9 further includes modified air exhaust conduits 92, 94a, 94b in place of the first and second air exhaust conduits 22, 24 described with reference to FIGS. 1–4. As with the previous described embodiment, the separation apparatus 84 includes two distinct separating devices. The first separating device is the perforated arcuate back outer wall 98 of the generally cylindrical casing 102. The perforated surface 98 allows much of the air to exit the separating apparatus 84 in a generally tangential orientation. In particular, as the stream of air and entrained material enters the separating chamber 88 via the inlet 86, it encounters the perforated surface 98 of the separator apparatus 84. Much of the air stream passes through the perforations while the entrained material is directed in a downward orientation by the arcuate perforated surface. The dimensions of the perforations and cross sectional area of the perforated surface 98 are chosen such that between about 50% and 75%, and more preferably about 60% of the volume of the air stream passes through the perforated surface 98 and the entrained material stays within the separating chamber 88.

The remaining portion of the air subsequently encounters the second air separating device. The second air separating device is a perforated cylinder 104 centrally disposed in the separation chamber 88 and generally coaxial to the axis of the cylindrical casing 102. Again, the size of the perforations as well as the dimensions of the perforated cylinder 104 are chosen to allow much of the remaining air within the separating chamber 88 to be separated from the material. The separated air is then channeled away from the separator apparatus 84 via dual air exhaust conduits 94a and 94b. The dual air exhaust conduits, 94a and 94b, are attached to each end 106, 108 of the perforated cylinder 104 and extend from the respective sides 110, 112 of the separator apparatus 84. The entrained material remaining within the separating chamber 88 continues along the original path to the bottom 114 of the casing 102 and eventually out the material discharge exit 90.

The distinguishing feature between this illustrated embodiment and the previously described embodiment is found in the configuration of the air exhaust conduits 92, 94a and 94b. Advantageously, the central air exhaust conduits 94a and 94b, in the embodiment shown in FIGS. 7–9, is adapted to provide bi-directional flow of the air out of the separating chamber 88 through each side 110 and 112 of the cylindrical casing 102. The bi-directional flow from each side 110, 112 of the separator apparatus 84 tends to maintain the air exit velocity at moderate levels. The plurality of air exhaust conduits 92, 94a and 94b are joined together at a location downstream of the separator apparatus 84 such that the exit air flow is directed to a single air outlet 96. The air discharged from the air outlet 96 is first passed through a filter 114 to remove dust and other contaminants so that the exit air can be safely reintroduced into the immediate environment. Such an arrangement retains the advantage of having multiple air exits in a separator system while simplifying the incorporation of a filter.

From the foregoing, it should be appreciated that the present invention thus provides an improved method and apparatus for separator material entrained in a stream of air or similar transport medium. Further, it will be apparent that various changes may be made in the form, construction and arrangement of the parts thereof without departing from the spirit and scope of the invention or sacrificing all of its material advantages, the forms hereinbefore described being merely exemplary embodiments thereof. Therefore, it is not intended that the scope of the invention be limited to the specific embodiments and processes described. Rather, it is intended that the scope of this invention be determined by the appending claims and their equivalents.

What is claimed is:

1. A separator for separating material transported by air, the separator comprising:
   a separator casing;
   an inlet peripherally attached to said casing and adapted to receive a stream of air and entrained material;
   a means for peripherally removing a prescribed volume of air from said stream of air and material received at said inlet thereby slowing said stream of air and material and reducing the static air pressure within said casing, wherein said prescribed volume of air peripherally removed is greater than about 50 percent of the volume of air received at said inlet;
   a first air exhaust conduit peripherally attached to said casing and operatively associated with said means for peripherally removing said prescribed volume of air;
   an outlet peripherally attached to said casing and adapted to discharge said originally entrained material from said casing;
   a perforated cylinder centrally disposed within said casing and around which said entrained material passes, said perforated cylinder being adapted for separating additional air from said material within said casing thereby further slowing said stream of air and material proximate said outlet as said material is transported through said casing and further reducing the static air pressure within said casing; and
   a second air exhaust conduit operatively associated with said perforated cylinder through which said separated additional air is transported out of said casing.

2. The separator as set forth in claim 1 wherein said means for peripherally removing said prescribed volume of air further includes a plurality of perforations in an outer wall of said casing proximate said inlet.

3. The separator as set forth in claim 1 wherein said casing is a substantially cylindrical casing and said inlet is tangentially attached to said substantially cylindrical casing.

4. The separator as set forth in claim 3 wherein said means for peripherally removing said prescribed volume of air further includes a plurality of perforations in an arcuate outer wall of said substantially cylindrical casing proximate said inlet.

5. The separator as set forth in claim 4 wherein said first air exhaust conduit is a duct covering said plurality of perforations in said arcuate outer wall of said substantially cylindrical casing and connecting to an air outlet separated from said casing.

6. The separator as set forth in claim 5 wherein said perforated cylinder is a stationary cylinder centrally disposed within said substantially cylindrical casing and parallel to an axis of said substantially cylindrical casing.

7. The separator as set forth in claim 6 wherein said second air exhaust conduit includes at least one duct in communication with said perforated cylinder and connecting to a second air outlet separated from said casing.

8. The separator as set forth in claim 6 wherein said second air exhaust conduit includes at least one duct in communication with said perforated cylinder and connected to said first air exhaust conduit and said air outlet.

9. A method for separating material transported by air, the method comprising the steps of:
   (a) receiving a stream of air and material at an inlet of a casing, said inlet being disposed at the periphery of said casing;
   (b) removing more than about 50 percent of a volume of air from said stream of air and material received at said inlet of said casing via a peripheral exit thereby slowing said stream of air and material and reducing the static air pressure within said casing;
   (c) further separating air from said material within said casing using a perforated cylinder centrally disposed within said casing thereby further slowing said stream of air and material as said material is transported through said casing and further reducing the static air pressure within said casing;
   (d) discharging said material from said casing via a material outlet, said material outlet being located at the periphery of said casing and apart from said inlet.

10. The method for separating material transported by air as set forth in claim 9 further comprising the steps of:
    (e) directing said air removed in step (b) above, via an exhaust conduit to an air outlet located apart from said casing; and
    (f) transporting said air separated in step (c) above, via a second exhaust conduit to a location outside of said casing.

11. The method for separating material transported by air as set forth in claim 10 wherein step (b) further includes removing more than about 50 percent of a volume of air from said air stream through a plurality of perforations in an outer wall of said casing proximate said inlet thereby slowing said stream of air and material and reducing the static air pressure within said casing.

12. The method for separating material transported by air as set forth in claim 10 further including the step of combining said removed volume of said air and said separated air proximate said air outlet.

13. The method for separating material transported by air as set forth in claim 12 further including the step of filtering said air present at said air outlet.

14. An apparatus for separating pneumatically conveyed paper product from the air, the apparatus comprising:
    a separator casing;
    an inlet peripherally attached to said casing and adapted to receive a tangentially oriented stream of air and entrained paper;
    a means for peripherally removing a prescribed volume of air from said stream of air and entrained paper received at said inlet thereby slowing said stream of air and entrained paper and reducing the static air pressure within said casing, wherein said prescribed volume of air peripherally removed is greater than about 50 percent of the volume of air received at said inlet;
    a first air exhaust conduit peripherally attached to said casing and operatively associated with said means for peripherally removing said prescribed volume of air;
    an outlet peripherally attached to said casing and adapted to discharge said originally entrained paper from said casing;
    means for further separating any remaining air from said entrained paper within the casing thereby further slowing said stream of air and entrained paper proximate said outlet as said paper is transported through said casing and further reducing the static air pressure within said casing; and a second air exhaust conduit operatively associated with said means for further separating air from said paper through which said separated air is transported out of said casing.

15. The apparatus as set forth in claim 14 wherein said means for peripherally removing said prescribed volume of air further includes a plurality of perforations in an outer wall of said casing proximate said inlet.

16. The apparatus as set forth in claim 14 wherein said first air exhaust conduit is a duct covering said plurality of perforations in said outer wall of said casing and connecting to an air outlet separated from said casing.

17. The apparatus as set forth in claim 14 wherein said means for further separating any remaining air from said entrained paper within the casing is a perforated cylinder centrally disposed within said casing.

18. The apparatus as set forth in claim 17 wherein said perforated cylinder is a stationary cylinder centrally disposed within said casing.

19. The apparatus as set forth in claim 17 wherein said second air exhaust conduit includes at least one duct in communication with said perforated cylinder and connecting to a second air outlet separated from said casing.

20. The apparatus as set forth in claim 18 wherein said second air exhaust conduit includes at least one duct in communication with said perforated metal cylinder and connected to said first air exhaust conduit and said air outlet.

* * * * *